US00RE38067E

(19) United States
(12) Reissued Patent
Gueret

(10) Patent Number: US RE38,067 E
(45) Date of Reissued Patent: Apr. 8, 2003

(54) DEVICE FOR SEPARATELY STORING AT LEAST TWO SUBSTANCES, FOR MIXING THEM TOGETHER, AND FOR DISPENSING THE MIXTURE OBTAINED THEREBY, AND A METHOD OF MANUFACTURE

(75) Inventor: Jean-Louis H. Gueret, Paris (FR)

(73) Assignee: L'Oreal, Paris (FR)

(21) Appl. No.: 09/815,537

(22) Filed: Mar. 22, 2001

Related U.S. Patent Documents

Reissue of:
(64) Patent No.: 5,884,759
Issued: Mar. 23, 1999
Appl. No.: 08/880,406
Filed: Jun. 23, 1997

(30) Foreign Application Priority Data

Jun. 28, 1996 (FR) ..... 96 08097

(51) Int. Cl.[7] ..... B65D 25/08; B67D 5/56; B67D 5/06

(52) U.S. Cl. ..... 206/222; 206/219; 222/145.5; 222/129

(58) Field of Search ..... 222/145.5, 145.1, 222/80, 185.1, 94; 206/222, 129, 219

(56) References Cited

U.S. PATENT DOCUMENTS

| | | | | |
|---|---|---|---|---|
| 2,721,552 A | | 10/1955 | Nosik | |
| 3,156,369 A | | 11/1964 | Bowes et al. | |
| 3,603,469 A | | 9/1971 | Magni | |
| 3,768,697 A | * | 10/1973 | Lerner | 222/80 |
| 3,802,604 A | * | 4/1974 | Morane et al. | 222/83 |
| 4,795,043 A | | 1/1989 | Odet et al. | |
| 4,798,287 A | | 1/1989 | Groves et al. | |
| 5,692,644 A | | 12/1997 | Gueret | |
| 6,098,795 A | * | 8/2000 | Mollstam et al. | 206/222 |

FOREIGN PATENT DOCUMENTS

| | | |
|---|---|---|
| EP | 0 694 483 A1 | 1/1996 |
| FR | 2 290 366 | 6/1976 |
| FR | 2 616 322 | 12/1998 |
| WO | WO 97 09242 | 3/1997 |

OTHER PUBLICATIONS

English language abstract of EP 0 694 483 A1, (Dec. 2, 1997).
English lanuage abstract of FR 2 616 322, (Dec. 16, 1988).

* cited by examiner

*Primary Examiner*—Henry C. Yuen
*Assistant Examiner*—Davis Hwu
(74) *Attorney, Agent, or Firm*—Finnegan, Henderson, Farabow, Garrett & Dunner, L.L.P.

(57) ABSTRACT

The invention relates to a device enabling at least two substances to be stored separately, to be mixed together, and the resulting mixture to be dispensed, said device being of the type comprising a receptacle and at least one removable shutter suitable for separating, inside the receptacle, two chambers for respectively containing said substances prior to first use of the device, the device further including a pushbutton for moving on first use to cause said shutter to be removed or torn and to put the two chambers into communication with each other. The device comprises a gasket including a portion fixed to the receptacle and a deformable portion made of an elastically-deformable material suitable for deforming when the pushbutton is depressed so to accompany the movement thereof while simultaneously constituting a sealed barrier between the inside of the receptacle and the pushbutton.

57 Claims, 3 Drawing Sheets

DEVICE FOR SEPARATELY STORING AT LEAST TWO SUBSTANCES, FOR MIXING THEM TOGETHER, AND FOR DISPENSING THE MIXTURE OBTAINED THEREBY, AND A METHOD OF MANUFACTURE

Matter enclosed in heavy brackets [ ] appears in the original patent but forms no part of this reissue specification; matter printed in italics indicates the additions made by reissue.

The present invention relates to separately storing at least two substances, to mixing them together, and to dispensing the resulting mixture.

BACKGROUND OF THE INVENTION

French patent application 2 290 366 discloses a device enabling two substances to be stored separately, to be mixed together, and the resulting mixture to be dispensed, that device comprising a necked receptacle containing one of the substances and a perforated plate made of a semi-rigid plastics material such as polyvinyl chloride, containing the other substance and disposed on the neck of the receptacle.

A pushbutton is provided to tear off a tab closing the perforated plate and to enable the substance contained therein to fall into the receptacle and be mixed with the other substance.

Also known, from French patent application FR 2 722 765 in the name of the Applicant company, is a device comprising a receptacle and a removable shutter placed inside the receptacle for separating two chambers respectively containing the two substances prior to first use. On first use of the device the shutter is removed or torn by means of a pushbutton so as to put said chambers into communication and enable said substances to be mixed together. On each occasion that the pushbutton is depressed, it is also advantageously used to establish a pressure rise within the receptacle and the expulsion of a predetermined quantity of the mixture. A return spring enable the pushbutton to be returned to its initial position when the user releases it. Typically, since at least one of the two substances is a liquid, it is necessary for the pushbutton to move in sealed manner relative to the receptacle so as to avoid any leakage. Sealing is obtained by the pushbutton being an exact fit in a cylindrical portion of the receptacle, and, if necessary, sealing is reinforced by the presence of a sealing skirt surrounding said cylindrical portion. A tamperproofing ring can prevent the pushbutton being moved so long as the ring is present on the receptacle. Such a device has rather a large number of component parts and it is therefore relatively expensive to manufacture and to assemble.

OBJECTS AND SUMMARY OF THE INVENTION

An object of the present invention is to further improve that type of device, in particular for the purpose of reducing its manufacturing cost.

The invention achieves this by providing a novel device for separate storage of at least two substances, for mixing them together, and for dispensing the mixture obtained in this way, the device being of the type comprising a receptacle, at least one removable shutter suitable, prior to first use of the device, for separating two chambers within the receptacle for containing said substances respectively, and a pushbutton for moving during first use to cause said shutter to move away to be torn and to put the two chambers into communication with each other, the device including a gasket comprising a portion fixed to the receptacle and a deformable portion made of an elastically-deformable material, suitable for deforming when the pushbutton is depressed so as to accompany the movement thereof, while continuing to constitute a sealing barrier between the inside of the receptacle and the pushbutton.

Because of the invention, manufacture and assembly of the device can be simplified since the pushbutton and the receptacle no longer need to be fitted together precisely in order to obtain sealing in use and during storage. The pushbutton and the receptacle can also have a wide variety of shapes.

The deformable portion of the gasket, made of an elastically-deformable material, behave like a spring serving to return the pushbutton each time it is released by the user.

The pushbutton can thus be used to generate excess pressure inside the receptacle each time it is depressed, and to cause a predetermined quantity of mixture to be expelled.

Preferably, the pushbutton is connected to the receptacle by at least one bridge of breakable material for breaking on first use. Manufacture of the device is thus simplified since the pushbutton can be integrally molded with a portion of the receptacle. The bridge(s) of material which is/are broken on first use serve advantageously as tamperproofing indicators. This avoids the use of a tamperproofing ring applied to the receptacle of the kind that is to be found in prior art devices.

Advantageously, the pushbutton is shaped so that on first use it deforms said deformable portion in such a manner as to form a pointed zone for striking the shutter.

Preferably, the gasket is made of a thermoplastic elastomer, thereby facilitating recycling of the device.

The gasket can be made deformable by having a special shape, such as localized thinning of its wall. In a variant, it is also possible to shape the deformable portion of the gasket as a bellows.

Preferably, the deformable portion of the gasket is generally in the form of a glove finger whose transverse dimension is selected so that at least a part of said deformable portion remains substantially in contact with the wall of the receptacle during displacement of the pushbutton. Preferably, one of the substances is contained in a chimney of the receptacle, the pushbutton is mounted on the receptacle so as to be capable of being moved over a depression stroke greater than or equal to the maximum height of the substance contained in said chimney, and said deformable portion has one end adapted to slide in contact with the wall of said chimney. This makes it possible to expel substantially all of the substance contained in one of the chambers into the other chamber on first depression of the pushbutton. This ensures that when the substance in contact with the gasket is a powder, while the other substance contained in the receptacle is a liquid, no lumps of powder remain in nooks or crannies when the two chambers are put into communication with each other.

The free end of the deformable portion may have one or more portions in relief for creating one or more tear starters in the shutter or for facilitating departure thereof by exerting localized thrust suitable for facilitating displacement thereof relative to the receptacle.

Provision can thus be made at the free end of the deformable portion of the gasket for a central stud or a peripheral annular lip that is continuous or otherwise.

In a particular embodiment of the invention, the receptacle is formed by assembling together a hollow body and an end portion including a base for fixing to said body and a cover fixed to the base and connected via at least one bridge of material to the pushbutton prior to first use of the device. Advantageously, said base, said cover, and said pushbutton are integrally molded as a single piece, with the base being connected via a film hinge to the cover. In this way, manufacture and assembly of the device are greatly simplified compared with prior art devices. In a variant, the cover can be made independently from the base and can be fixed thereon by snap-fastening. Also, it is possible to make the base and the cover having various profiles depending on the desired appearance, but that are preferably selected so that, after the base and the cover have been assembled together, they confer a shape to the end portion suitable for serving as a grip or an abutment for the fingers of the user in order to prevent the device from sliding when the user presses down on the pushbutton.

The shutter may be constituted by an aluminum film heat sealed onto said base. In a variant, it may be integrally molded with the receptacle. It may also be constituted by a separate plug placed in the receptacle.

The portion of the pushbutton which comes into contact with the gasket may be of various different shapes.

In a particular embodiment of the invention, it is thus possible to make said portion in the form of a set of tongues organized to constitute a cone converging towards the center of the gasket and pressing via their free ends substantially against the middle of the gasket and over a small extent so as to exert central thrust on the shutter.

Preferably, means are provided for retaining the pushbutton on the receptacle after the bridge(s) of material that act as tamperproofing indicator(s) has/have been broken.

It is thus possible to secure the gasket to the pushbutton by adhesive, heat sealing, friction, or snap-fastening. It is also possible to provide the receptacle and/or the pushbutton with catches or tongues capable of retaining the pushbutton after it has been pushed down initially.

The invention also provides a method of manufacturing a device for separately storing at least two substances, for mixing them together, and for dispensing the mixture obtained in this way, the method comprising the steps consisting in:

- making a hollow body provided with removable closure means at one end and open at another end;
- making an end portion by integral molding, said end portion including a base and a cover connected together by a film hinge, said cover including a pushbutton connected to the remainder of the cover via at least one bridge of breakable material, said end portion including a chimney;
- fixing or forming a removable shutter at one end of said chimney;
- filling said chimney with a first substance;
- applying a gasket onto said chimney and shaped to close said chimney;
- applying the cover onto the base by pivoting about the axis of rotation of said film hinge;
- filling said hollow body with a second substance via said open end; and
- fitting said end portion on said open end of said hollow body.

BRIEF DESCRIPTION OF THE DRAWINGS

Other characteristics and advantages of the present invention appear on reading the following detailed description of non-limiting embodiments of the invention, and on examining the accompanying drawings, in which.

MORE DETAILED DESCRIPTION

Figure 1:
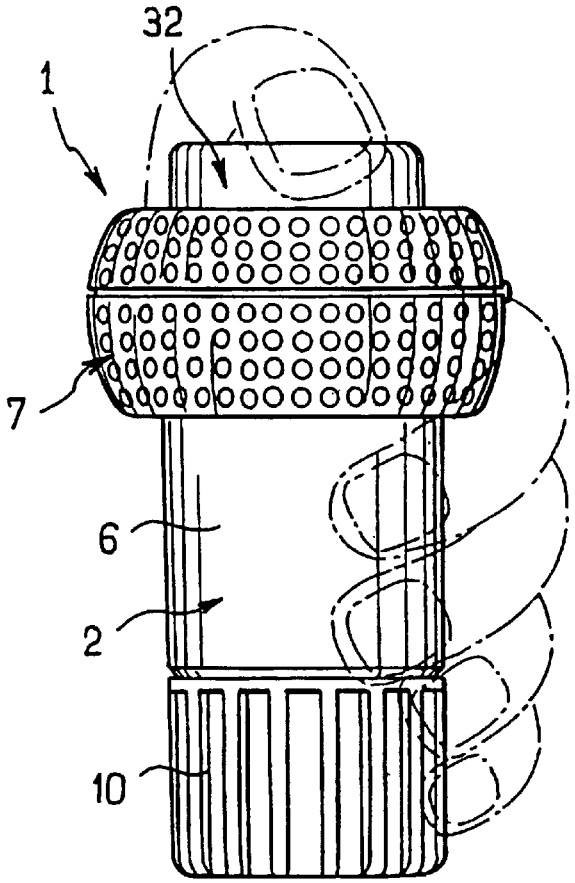
FIG. 1 is a side elevation view of a device constituting a particular embodiment of the invention.
Figure 2:
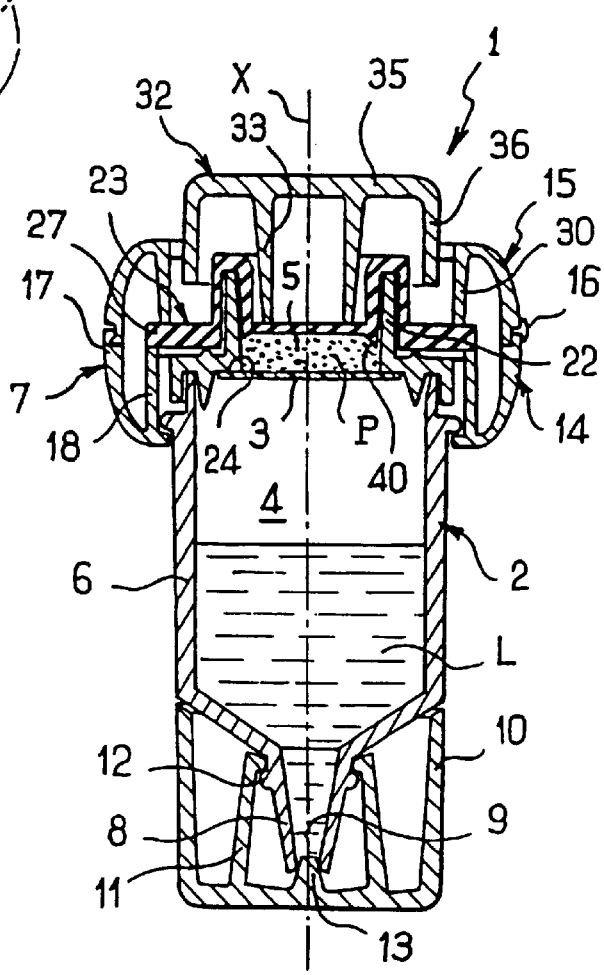
FIG. 2 is a diagrammatic longitudinal section through the device shown in FIG. 1.

FIGS. 1 and 2 show a device 1 constituting a first embodiment of the invention, comprising a receptacle 2 and a shutter 3 subdividing the inside of the receptacle into two chambers 4 and 5.

In the particular embodiment described, the chamber 4 situated in the bottom portion of the receptacle contains a liquid substance L, and the chamber 5 situated in the top portion of the receptacle contains a powder substance P. The volume of the chamber 4 is considerably greater than that of the chamber 5. Naturally, it would not go beyond the ambit of the invention to use the device 1 for separately packaging two liquids.

The receptacle 2 is formed by assembling together an end portion 7 and a hollow body 6, which is generally tubular and elongate along a longitudinal axis X in the example described. The body 6 is provided at its bottom end with a neck 8 defining an orifice 9 for dispensing the mixture.

When the device is not in use, the orifice 9 is closed by a removable closure cap 10 which can be fixed by any known means onto the neck 8.

In the embodiment described, the cap 10 comprises an inner tubular skirt 11 shaped to snap onto an annular rim 12 provided in the vicinity of the base of the neck 8, and a central stud 13 shaped to close the orifice 9. The cap 10 and the neck 8 may, in a variant, be shaped to co-operate by screw engagement, and it is also possible to provide any other means for closing the dispensing orifice 9 without going beyond the ambit of the present invention.

The end portion 7 includes a base 14 designed to be snap-fastened onto the open top end of the body 6, and a cover 15.

Figure 4:
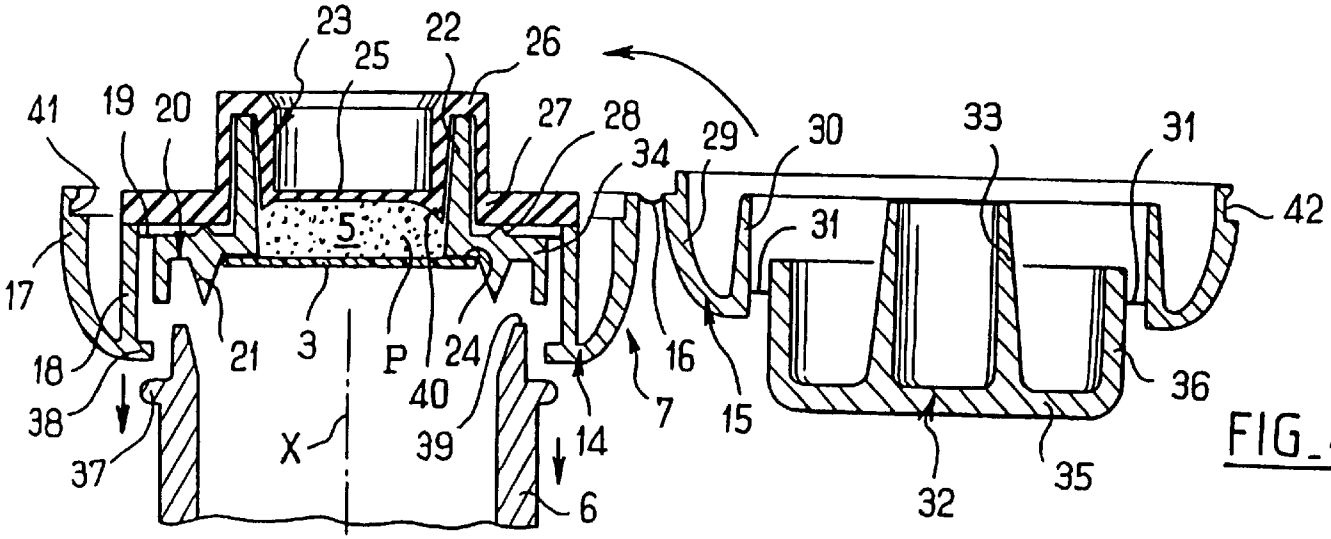
FIG. 4 is a diagrammatic and fragmentary section showing how the device is assembled.

In the embodiment described, the cover 15 is connected by a bridge of material 16 constituting a film hinge to the base 14, and it is secured by snap-fastening on said base after being pivoted through 180°, as shown in FIG. 4.

The base 14 includes an outer shell 17 extended upwards at its bottom end by a cylindrical inner skirt 18 surrounding the top end of the body 6 when the end portion 7 is in place, as shown in FIG. 2.

The inner skirt 18 is connected via bridges of material 19 to a central piece 20 having a ring 34 in the bottom portion thereof defining a downwardly open annular groove 21 and shaped to engage on the top end of the body 6. The top portion of the piece 20 includes a chimney 22 centered on the longitudinal axis X. The chimney 22 is generally cylindrical and it is closed at its bottom end by the shutter 3 and at its top end by a gasket 23.

In the particular embodiment described, the shutter is constituted by an aluminum film heat sealed to an annular surface 24 surrounding the bottom orifice of the chimney 22.

The gasket 23 is made of an elastically-deformable material and presents a central wall 25 engaged in the chimney 22 and of outline that matches that of the cross-section of the chimney. In the particular example described, the wall 25 is circular and has an outside diameter corresponding substantially to the inside diameter of the chimney 22. The wall 25 is extended upwards at its periphery by a wall 26 forming a downwardly open annular groove that is to close the top end of the chimney 22 in sealed manner. The wall 26 is extended radially outwards at its end remote from its end connected to the wall 25 by an annular wall 27 which extends substantially perpendicularly to the longitudinal axis X. The wall 25 and the portion of the wall 26 situated inside the chimney 22 constitute a glove finger.

The cover 15 includes a shell 29 co-operating with the shell 17 of the base 14 after being snap-fastened thereto to form an outwardly convex annular swelling, as shown in FIGS. 1 and 2. The outside surfaces of the shells 17 and 29 may have portions in relief for the. purpose of giving the device 1 a particular appearance, and making it possible, where appropriate, to make the device 1 more ergonomic for holding purposes while in use. In FIG. 4, references 41 and 42 designate annular grooves formed in the shells 17 and 29 respectively, and intended to enable them to be fixed together by snap-fastening.

The shell 29 is extended at its radially innermost end by a cylindrical inner skirt 30 which comes into contact with the wall 27 of the gasket 23 when the cover 15 is fixed on the base 14, as shown in FIG. 2.

Until first use of the device, the inner skirt 30 is connected by bridges of breakable material 31 to a pushbutton 32.

As explained below, the inside of the pushbutton 32 is provided with stock 33 serving to transmit thrust. The stock 33 has one end connected to a wall 35 substantially perpendicular to the longitudinal axis X and constituting the top of the pushbutton 32. This wall 35 is extended at its periphery by an outer skirt 36 surrounding part of the stock 33.

The bridges of material 31 connect the outer skirt 36 to the inner skirt 30.

The locations of said bridges of material 31 and the shape of the pushbutton 32 are selected in such a manner that the pushbutton 32 extends outside the shell 29 while it is being held by the bridges of material 31 prior to being actuated, and as shown in FIGS. 1 and 2.

In the embodiment described, the base 14, the cover 15, and the pushbutton 32, are all manufactured as a single piece by injection molding in the configuration shown in FIG. 4. The film 3 is heat sealed onto the piece 20 and then the chimney 22 is filled with the substance P and the gasket 23 is put into place.

Thereafter, the cover 15 is pivoted through 180° and is snap-fastened onto the base 14. The wall 27 of the gasket 23 is then clamped between the top surface of the ring 34 and the free edge of the inner skirt 30, as shown in FIG. 2. The ring 34 may have an annular rib 28 on its face facing the gasket 23 for the purpose, where appropriate, of improving the sealing that is obtained between the piece 20 and the cover 15. The chamber 5 containing the substance P is isolated from ambient air by the gasket 23, thereby ensuring good conservation of the substance P until first use of the device.

Means are preferably provided for retaining the pushbutton 32 on the end portion 7 after the bridges of material 31 have been broken.

The stock 33 can thus be connected to the central wall 25 of the gasket 23 by adhesive, heat sealing, friction, or snap-fastening. It is also possible to provide retaining means on the pushbutton for co-operating with the cover, as described below.

The end portion 7 is snap-fastened onto the body 6 after it has been filled with the substance L, the neck 8 having previously been provided with its closure cap 10.

In the embodiment described, an annular rim 37 is formed in the vicinity of the top end of the body 6, and the base 14 includes internal projections 38 shaped to retain the end portion 7 on the body 6 when the end portion 7 is fixed on the body 6.

The top end face 39 of the body 6 then presses against the bottom of the groove 21 to close the receptacle in sealed manner. Naturally, it is possible to modify the way in which the end portion is fixed onto the body 6 without going beyond the ambit of the invention.

The body 6 is preferably not completely filled with the substance L so as to leave a volume of gas that facilitates mixing of the two substances after the shutter 3 has been removed or torn.

On first use of the device, the user exerts pressure on the pushbutton 32, thereby breaking the bridges of material 31 securing it to the inner skirt 30.

Depression of the pushbutton 32 exerts pressure on the gasket 23 which, in the embodiments described, transmits the pressure to the substance P contained in the chamber 5, thereby causing the film 3 to be torn and the substance P to be ejected into the inside of the body 6 so as to be mixed with the substance L.

In the embodiment described, the wall 25 is provided at its periphery and on its face that is in contact with the substance P with a portion in relief 40 that serves to create a tear starter in the shutter 3.

The force to be exerted on the wall 35 of the pushbutton to put the chambers 4 and 5 into communication with each other is thus reduced, and the shutter 3 is expelled or torn in predetermined manner.

Also, the stock 33 does not exert significant thrust on the shutter 3 so long as the bridges of material 31 have not been broken. On first use of the device 1, these bridges break relatively suddenly, so the stock 33 then acts as a striker capable of projecting all or nearly all of the substance P deep into the substance L, and regardless of the orientation of the device. This results in the substance P being mixed quickly and effectively within the substance L.

Figure 3:
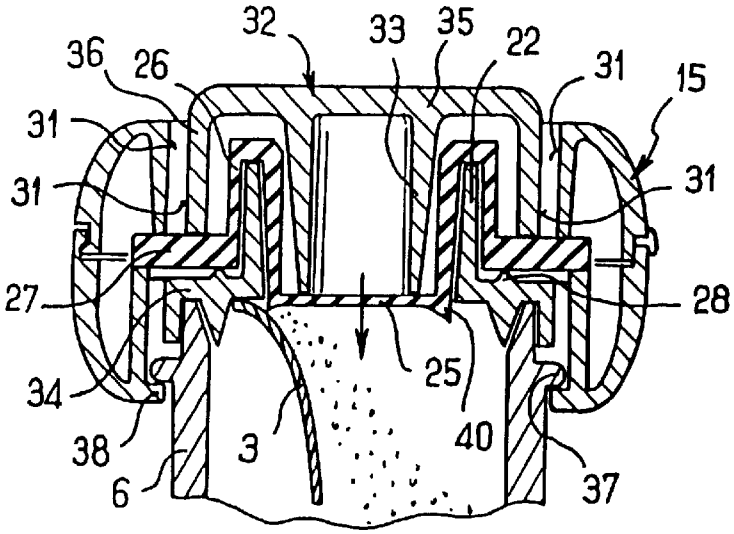
FIG. 3 is a view analogous to FIG. 2 showing the pushbutton after the bridges of breakable material connecting it to the receptacle have been broken.

During descent of the pushbutton 32, the gasket 23 deforms to follow the movement of the stock 33 while continuing to close the top end of the chamber 5 in sealed manner, as shown in FIG. 3. More precisely, in the embodiment described, the portion of the wall 26 situated inside the chimney 22 stretches elastically while the pushbutton 32 is depressed because of the elasticity of the material from which it is made, with the elongation of this wall portion 26 being capable of being as much as 10% or more of its initial height. When the user relates the pushbutton, the elastically-deformed portion of the gasket 23 tends to return to its initial shape and return the pushbutton 32 into its original position. It will be observed that at the end of the down stroke, the outer skirt 36 comes into abutment against the wall 27 of the gasket 23. This thus avoids any shock between portions made of rigid plastics material, thereby improving comfort in use and reducing the risk of the device 1 being damaged.

The pushbutton 32 is advantageously used so that each time it is depressed and moves over a predetermined stroke relative to the receptacle, it generates a small amount of extra pressure inside the receptacle, thereby causing a predetermined quantity of the mixture to be expelled through the orifice 9.

Figure 5:
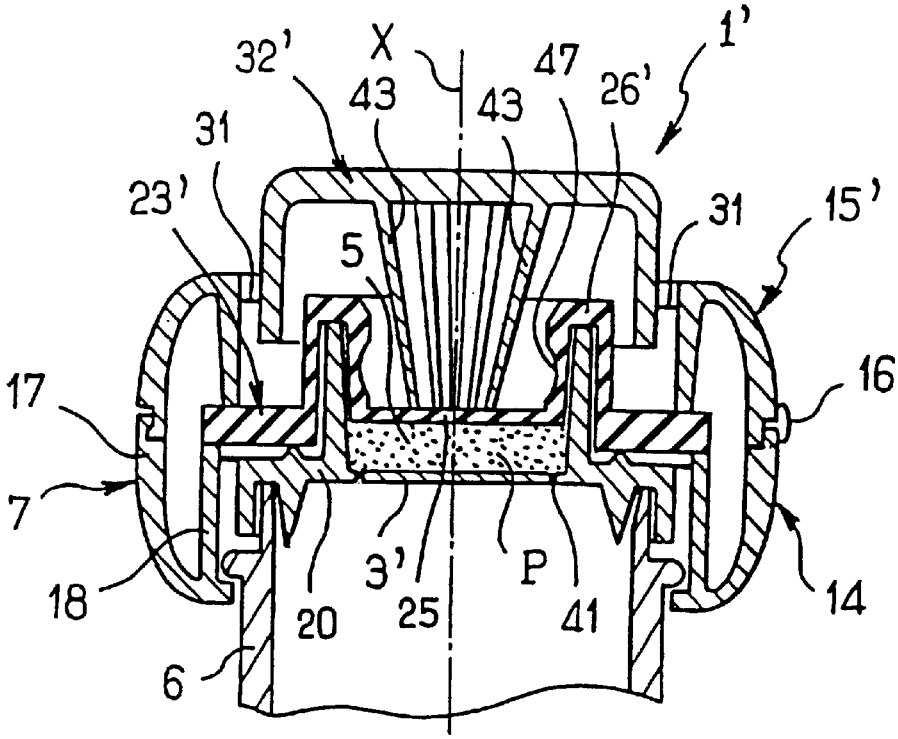
FIGS. 5 and 6 are diagrammatic section views showing various embodiments of the invention.

FIG. 5 shows a device 1' comprising a second embodiment of the invention.

This device has certain elements that are identical to those of the preceding embodiment. These elements are given identical references in the figures and they are not described again.

The device 1' shown in FIG. 5 differs from the above-described device 1 specifically by the fact that the shutter is no longer implemented in the form of a heat-sealed film, but in the form of a thin wall 3' integrally molded with the remainder of the base 14. As shown in FIG. 5, the wall 3' is preferably connected at its periphery via a ring of thinned-down material 41 so as to facilitate detachment thereof from the piece 20.

To illustrate the fact that the gasket can have various shapes without going beyond the ambit of the invention, FIG. 5 shows a gasket 23' that differs from the gasket 23 as described above by the fact that the wall 25 is connected to the remainder of the gasket by a wall 26' having an annular recess 47 in its inside surface, for the purpose of facilitating deformation of the gasket while it is accompanying downward movement of the pushbutton. It is thus possible to shape the gasket in such a manner that it deforms in predetermined manner when the pushbutton is depressed.

The pushbutton 32' in the embodiment described is shaped in such a manner as to exert thrust on a zone of small extent in the center of the wall 25 of the gasket 23'. More precisely, the pushbutton 32' is shaped so that on first use, it causes the deformable portion of the gasket to deform in such a manner as to form a pointed zone for striking the shutter, with the stock 33 of the preceding embodiment being replaced in the present embodiment by a set of fins 43 disposed in a cone that converges towards the center of the wall 25. When the user pushes in the pushbutton 32', the pushbutton presses against only the center of the wall 25 at the beginning of its descent, and thereby exerts via the substance P a high pressure on the center on the shutter 3', facilitating ejection or tearing thereof. The fact of exerting thrust mainly in the center also makes it possible to avoid compacting the substance P as a whole on initial depression of the pushbutton.

Figure 6:
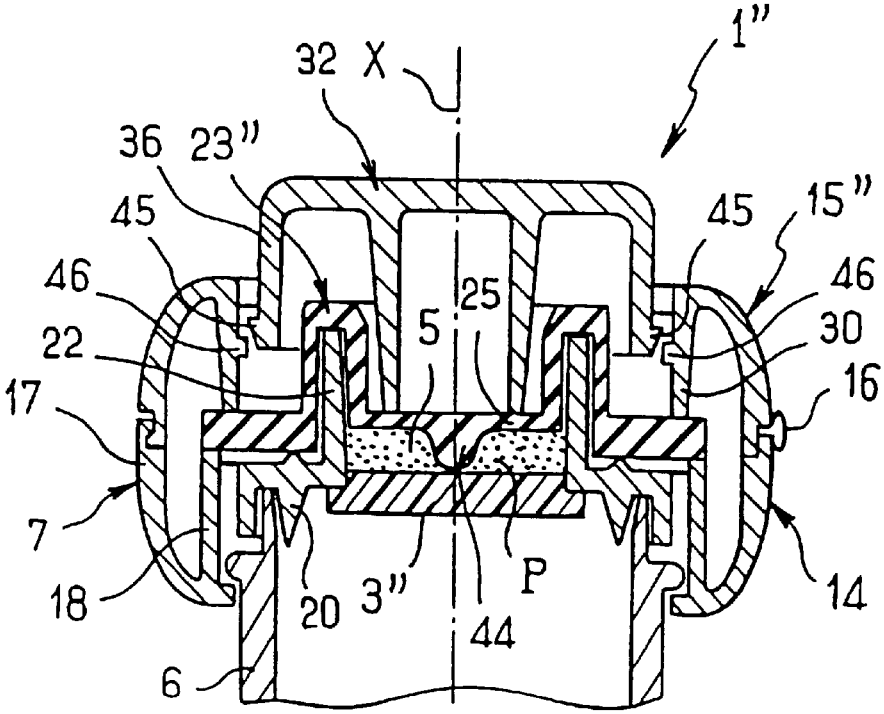

FIG. 6 shows a device 1" constituting a third embodiment of the invention.

The device 1" differs from the preceding devices specifically by the fact that the shutter is constituted by a plug 3" fitted in the bottom opening of the chimney 22. In addition, the gasket 23" has in the center of its wall 25 and on its face in contact with the substance P, a stud 44 whose tip presses against the shutter 3". Thus, when the pushbutton 32 is depressed, thrust is transmitted via the stud 44 directly to the shutter 3" without passing via a significant thickness of the substance P. This avoids compacting the substance P on the first occasion the pushbutton is depressed.

Also, in order to illustrate the fact that it is possible to retain the pushbutton 32 in a manner other than by securing it to the gasket, FIG. 6 shows catches 45 formed at the periphery of the outer skirt 36 of the pushbutton 32 and capable of bending elastically when the pushbutton 32 is depressed for the first time so as to pass over latch projections 46 formed on the radially inner surface of the skirt 30. These projections 46 are shaped to retain the pushbutton 32 on the cover 15 after first use of the device.

In all three embodiments described above, the wall 25 remains substantially in contact with the radially inner surface of the chimney 22, and the pushbutton moves over a stroke that is advantageously greater than or equal to the maximum height of substance contained in the chamber 5 so as to ensure that substantially all of the substance contained in the chamber 5 is ejected on first depression of the pushbutton, regardless of the position in which the device is held.

Naturally, the invention is not limited to the embodiments described above.

In particular, the shape of the hollow body 6 and the shape of the end portion 7 can be modified, with the fact of using two portions 14 and 15 interconnected by a film hinge allowing a wide variety of shapes for making the end portion 7.

Without going beyond the ambit of the invention, it is also possible to mount a plurality of removable shutters inside the receptacle for separate storage, mixing, and dispensing of more than two substances. It is thus possible to provide a plurality of chambers in the chimney 22 which are separated from one another by shutters that are ejected or torn on initial actuation of the pushbutton.

Also, the dispenser orifice may be of any kind, for example it may be constituted by a porous applicator such as a sintered form, a paint brush, or a dropper.

I claim:

1. A device enabling at least two substances to be stored separately, to be mixed together, and the resulting mixture to be dispensed, the device being of the type comprising a receptacle and at least one removable shutter suitable for separating inside the receptacle two chambers containing said substances respectively prior to first use of the device, the device further including a pushbutton for moving on first use to cause said shutter to be moved away or torn and the two chambers to be put into communication with each other, the device including a gasket comprising a portion fixed to the receptacle and a deformable portion made of an elastically-deformable material, suitable for deforming when the pushbutton is depressed so as to accompany the movement thereof, while continuing to constitute a sealing barrier between the inside of the receptacle and the pushbutton.

2. A device according to claim 1, wherein said pushbutton is connected to the receptacle via at least one bride of breakable material for breaking on first use of the device.

3. A device according to claim 1, wherein said gasket is made out of a thermoplastic elastomer.

4. A device according to claim 1, wherein said deformable portion is in the form of a glove finger of transverse dimensions selected in such a manner that at least part of said deformable portion remains substantially in contact with the wall of the receptacle during displacement of the pushbutton.

5. A device according to claim 1, wherein said deformable portion is in the form of a bellows.

6. A device according to claim 1, wherein one of said chambers is formed inside a chimney of the receptacle that is closed at one end by said shutter and at its other end by said gasket.

7. A device according to claim 6, wherein the pushbutton is mounted on the receptacle in such a manner as to be capable of being moved over a depression stroke greater than or equal to the maximum height of substance in said chimney.

8. A device according to claim 6, wherein deformable portion has one end adapted to [side] *slide* in contact with the wall of said chimney.

9. A device according to claim 1, including means for retaining said pushbutton on the receptacle.

10. A device according to claim 9, wherein said pushbutton is secured to said gasket.

11. A device according to claim 9, wherein said receptacle and/or the pushbutton have resilient tongues or catches capable of retaining the pushbutton after initial depression thereof.

12. A device according to claim 1, wherein said gasket [ha s] *has* an end including at least one projection shaped to create a tear starter in the shutter or to exert thrust at a predetermined location on the shutter.

13. A device according to claim 1, wherein the pushbutton is shaped to exert localized thrust on a surface of small extent of the gasket.

14. A device according to claim 13, wherein the pushbutton is shaped so that during first use it causes said deformable portion to be deformed in such a manner as to form a pointed zone for striking the shutter.

15. A device according to claim 1, wherein the receptacle is formed by assembling together a hollow body and an end portion including a base for fixing to said body and a cover fixed to the base and connected to the pushbutton prior to first use of the device via said at least one bridge of material.

16. A device according to claim 15, wherein said base, said cover, and said pushbutton are integrally molded as a single piece, the base being connected to the cover via a film hinge.

17. A device according to claim 15, wherein said shutter is constituted by a wall integrally molded with the base.

18. A device according to claim 15, wherein said shutter is fixed on the base.

19. A device according to claim 18, wherein said shutter is constituted by an aluminum film heat sealed to said base.

20. A device according to claim 15, wherein said end portion projects from the outer surface of said hollow body to serve as an abutment or as a grip for the fingers of the user when the pushbutton is being depressed.

21. A device according to claim 1, wherein the substance contained in the chamber of the receptacle that is in contact with the gasket is a powder.

22. A device according to claim 1, wherein the depression stroke of the pushbutton is selected so as to create sufficient extra pressure inside the receptacle to enable a predetermined quantity of mixture to be expelled when the pushbutton is depressed.

23. A method of manufacturing a device for separately storing at least two substances, for mixing them together, and for dispensing the resulting mixture, the method comprising the steps consisting in:

making a hollow body provided with removable closure means at one end and open at another end;

making an end portion by integral molding, said end portion including a base and a cover connected together by a film hinge, said cover including a pushbutton connected to the remainder of the cover via at least one bridge of breakable material, said end portion including a chimney;

fixing or forming a removable shutter at one end of said chimney;

filling said chimney with a first substance;

applying a gasket onto said chimney and shaped to close said chimney;

applying the cover onto the base by pivoting about the axis of rotation of said film hinge;

filling said hollow body with a second substance via said open end; and fitting said end portion on said open end of said hollow body.

*24. A device for mixing at least two substances to form a mixture, and for dispensing the mixture, the device comprising:*

*a receptacle;*

*a first chamber associated with the receptacle for containing a first substance;*

*a second chamber associated with the receptacle for containing a second substance;*

*at least one shutter isolating the first chamber from the second chamber when the device is in a storage position, the shutter being configured to be actuated to place the first chamber in flow communication with the second chamber;*

*a movable actuator configured to be moved to actuate the shutter and thereby enable mixing of the first substance and the second substance to form a mixture; and*

*a gasket providing a sealing barrier between the movable actuator and an interior portion of the receptacle, wherein the gasket comprises*

*a portion fixed to the receptacle, and*

*a deformable portion made of an elastically-deformable material, the deformable portion being configured to deform when the actuator is moved.*

*25. The device of claim 24, wherein the shutter separates an inside of the receptacle into the first and second chambers.*

*26. The device of claim 24, wherein the shutter is configured to be moved away from an initial position to place the first chamber in flow communication with the second chamber.*

*27. The device of claim 26, wherein the shutter is chosen from a plug and a portion of the receptacle configured to be detached from another portion of the receptacle.*

*28. The device of claim 24, wherein the shutter is configured to be torn to place the first chamber in flow communication with the second chamber.*

*29. The device of claim 28, wherein the shutter comprises a film of material sealing a passage in the receptacle.*

*30. The device of claim 24, wherein the movable actuator comprises a pushbutton.*

*31. The device of claim 30, wherein the pushbutton is movable between an initial position and a depressed position, and wherein the gasket is configured to return the pushbutton from the depressed position to the initial position.*

*32. The device of claim 30, further comprising at least one bridge of breakable material connecting the pushbutton to the receptacle.*

*33. The device of claim 24, further comprising at least one bridge of breakable material connecting the actuator to the receptacle.*

*34. The device of claim 34, wherein a portion of the gasket is configured to slide in contact with a wall surface of the receptacle when the actuator is moved to actuate the shutter.*

*35. The device of claim 24, wherein the actuator is in contact with the gasket.*

*36. The device of claim 24, wherein the device is configured to have a size such that the device may be held in one hand of a user during movement of the actuator.*

*37. The device of claim 24, further comprising a dispensing outlet flow communicating with an interior of the receptacle.*

*38. The device of claim 24, wherein the gasket is formed of a thermoplastic elastomer.*

*39. The device of claim 24, further comprising a powder contained in the first chamber and a liquid contained in the*

*second chamber, wherein the first chamber is between the gasket and the shutter.*

*40. The device of claim 24, further comprising a retainer retaining the actuator on the receptacle.*

*41. A device for mixing at least two substances to form a mixture, and for dispensing the mixture, the device comprising:*

*a receptacle including a first end portion and a second end portion opposite to the first end portion;*

*a first chamber associated with the receptacle for containing a first substance;*

*a second chamber associated with the receptacle for containing a second substance;*

*at least one shutter isolating the first chamber from the second chamber when the device is in a storage position, the shutter being configured to be actuated to place the first chamber in flow communication with the second chamber;*

*a movable actuator at the first end portion of the receptacle, the movable actuator being configured to be moved to actuate the shutter and thereby enable mixing of the first substance and the second substance to form a mixture;*

*a gasket providing a sealing barrier between the movable actuator and an interior portion of the receptacle during actuation of the shutter; and*

*a dispensing outlet at the second end portion of the receptacle.*

*42. The device of claim 41, wherein the shutter separates an inside of the receptacle into the first and second chambers.*

*43. The device of claim 41, wherein the shutter is configured to be moved away from an initial position to place the first chamber in flow communication with the second chamber.*

*44. The device of claim 41, wherein the shutter is configured to be torn to place the first chamber in flow communication with the second chamber.*

*45. The device of claim 44, wherein the shutter comprises a film of material sealing a passage in the receptacle.*

*46. The device of claim 41, wherein the movable actuator comprises a pushbutton.*

*47. The device of claim 41, wherein a portion of the gasket is configured to slide in contact with a wall surface of the receptacle when the actuator is moved to actuate the shutter.*

*48. The device of claim 41, wherein the actuator is in contact with the gasket.*

*49. The device of claim 41, wherein the device is configured to have a size such that the device may be held in one hand of a user during movement of the actuator.*

*50. The device of claim 41, further comprising a powder contained in the first chamber and a liquid contained in the second chamber, wherein the first chamber is between the gasket and the shutter.*

*51. The device of claim 41, further comprising a retainer retaining the actuator on the receptacle.*

*52. A device for mixing at least two substances to form a mixture, and for dispensing the mixture, the device comprising:*

*a receptacle including a first end portion and a second end portion opposite to the first end portion;*

*a first chamber associated with the receptacle for containing a first substance;*

*a second chamber associated with the receptacle for containing a second substance;*

*at least one shutter isolating the first chamber from the second chamber when the device is in a storage position, the shutter being configured to be actuated to place the first chamber in flow communication with the second chamber,*

*wherein the shutter is configured to be moved away from an initial position to place the first chamber in flow communication with the second chamber, and*

*wherein the shutter is chosen from a plug and a portion of the receptacle configured to be detached from another portion of the receptacle;*

*a movable actuator at the first end portion of the receptacle, the movable actuator being configured to be moved to actuate the shutter and thereby enable mixing of the first substance and the second substance to form a mixture;*

*a gasket providing a sealing barrier between the movable actuator and an interior portion of the receptacle; and*

*a dispensing outlet at the second end portion of the receptacle.*

*53. A device for mixing at least two substances to form a mixture, and for dispensing the mixture, the device comprising:*

*a receptacle including a first end portion and a second end portion opposite to the first end portion;*

*a first chamber associated with the receptacle for containing a first substance;*

*a second chamber associated with the receptacle for containing a second substance;*

*at least one shutter isolating the first chamber from the second chamber when the device is in a storage position, the shutter being configured to be actuated to place the first chamber in flow communication with the second chamber;*

*a movable actuator at the first end portion of the receptacle, the movable actuator being configured to be moved to actuate the shutter and thereby enable mixing of the first substance and the second substance to form a mixture,*

*wherein the movable actuator comprises a pushbutton, and*

*wherein the pushbutton is movable between an initial position and a depressed position;*

*a gasket providing a sealing barrier between the movable actuator and an interior portion of the receptacle,*

*wherein the gasket is configured to return the pushbutton from the depressed position to the initial position; and*

*a dispensing outlet at the second end portion of the receptacle.*

*54. A device for mixing at least two substances to form a mixture, and for dispensing the mixture, the device comprising:*

*a receptacle including a first end portion and a second end portion opposite to the first end portion;*

*a first chamber associated with the receptacle for containing a first substance;*

*a second chamber associated with the receptacle for containing a second substance;*

*at least one shutter isolating the first chamber from the second chamber when the device is in a storage position, the shutter being configured to be actuated to place the first chamber in flow communication with the second chamber;*

*a movable actuator at the first end portion of the receptacle, the movable actuator being configured to be*

*moved to actuate the shutter and thereby enable mixing of the first substance and the second substance to form a mixture,*

*wherein the movable actuator comprises a pushbutton;*

*a gasket providing a sealing barrier between the movable actuator and an interior portion of the receptacle;*

*a dispensing outlet at the second end portion of the receptacle; and*

*at least one bridge of breakable material connecting the pushbutton to the receptacle.*

*55. A device for mixing at least two substances to form a mixture, and for dispensing the mixture, the device comprising:*

*a receptacle including a first end portion and a second end portion opposite to the first end portion;*

*a first chamber associated with the receptacle for containing a first substance;*

*a second chamber associated with the receptacle for containing a second substance;*

*at least one shutter isolating the first chamber from the second chamber when the device is in a storage position, the shutter being configured to be actuated to place the first chamber in flow communication with the second chamber;*

*a movable actuator at the first end portion of the receptacle, the movable actuator being configured to be moved to actuate the shutter and thereby enable mixing of the first substance and the second substance to form a mixture;*

*a gasket providing a sealing barrier between the movable actuator and an interior portion of the receptacle; and*

*a dispensing outlet at the second end portion of the receptacle; and*

*at least one bridge of breakable material connecting the actuator to the receptacle.*

*56. A device for mixing at least two substances to form a mixture, and for dispensing the mixture, the device comprising:*

*a receptacle including a first end portion and a second end portion opposite to the first end portion;*

*a first chamber associated with the receptacle for containing a first substance;*

*a second chamber associated with the receptacle for containing a second substance;*

*at least one shutter isolating the first chamber from the second chamber when the device is in a storage position, the shutter being configured to be actuated to place the first chamber in flow communication with the second chamber,*

*a movable actuator at the first end portion of the receptacle, the movable actuator being configured to be moved to actuate the shutter and thereby enable mixing of the first substance and the second substance to form a mixture;*

*a gasket providing a sealing barrier between the movable actuator and an interior portion of the receptacle,*

*wherein the gasket is formed of a thermoplastic elastomer; and*

*a dispensing outlet at the second end portion of the receptacle.*

*57. A method of manufacturing a device for mixing at least two substances to form a mixture, and for dispensing the mixture, the method comprising:*

*providing a hollow body having an open end;*

*providing an end portion comprising a base and a cover connected together by a hinge, the cover including an actuator connected to the remainder of the cover via at least one bridge of breakable material, wherein the end portion further comprises a chimney;*

*placing an actuatable shutter on the chimney;*

*adding a first substance to the chimney;*

*placing a gasket on the chimney, the gasket being shaped to close the chimney;*

*applying the cover onto the base by pivoting movement about the hinge;*

*adding a second substance to the hollow body; and*

*fitting the end portion on the open end of said hollow body.*

* * * * *

UNITED STATES PATENT AND TRADEMARK OFFICE

CERTIFICATE OF CORRECTION

PATENT NO. : RE 38,067 E
DATED : April 8, 2003
INVENTOR(S) : Jean-Louis H. Gueret It is certified that error appears in the above-identified patent and that said Letters Patent is hereby corrected as shown below:

Column 8,
Line 43, please replace “bride” with -- bridge --.
Line 64, after “wherein”, please insert -- said --.

Column 13,
Line 31, please replace “receptacle; and” with -- receptacle; --.

Signed and Sealed this

Nineteenth Day of August, 2003

JAMES E. ROGAN
*Director of the United States Patent and Trademark Office*